No. 629,547. Patented July 25, 1899.
A. B. COUCH.
MACHINE FOR HULLING AND POLISHING GRAINS.
(Application filed Mar. 29, 1898.)
(No Model.) 2 Sheets—Sheet 1.
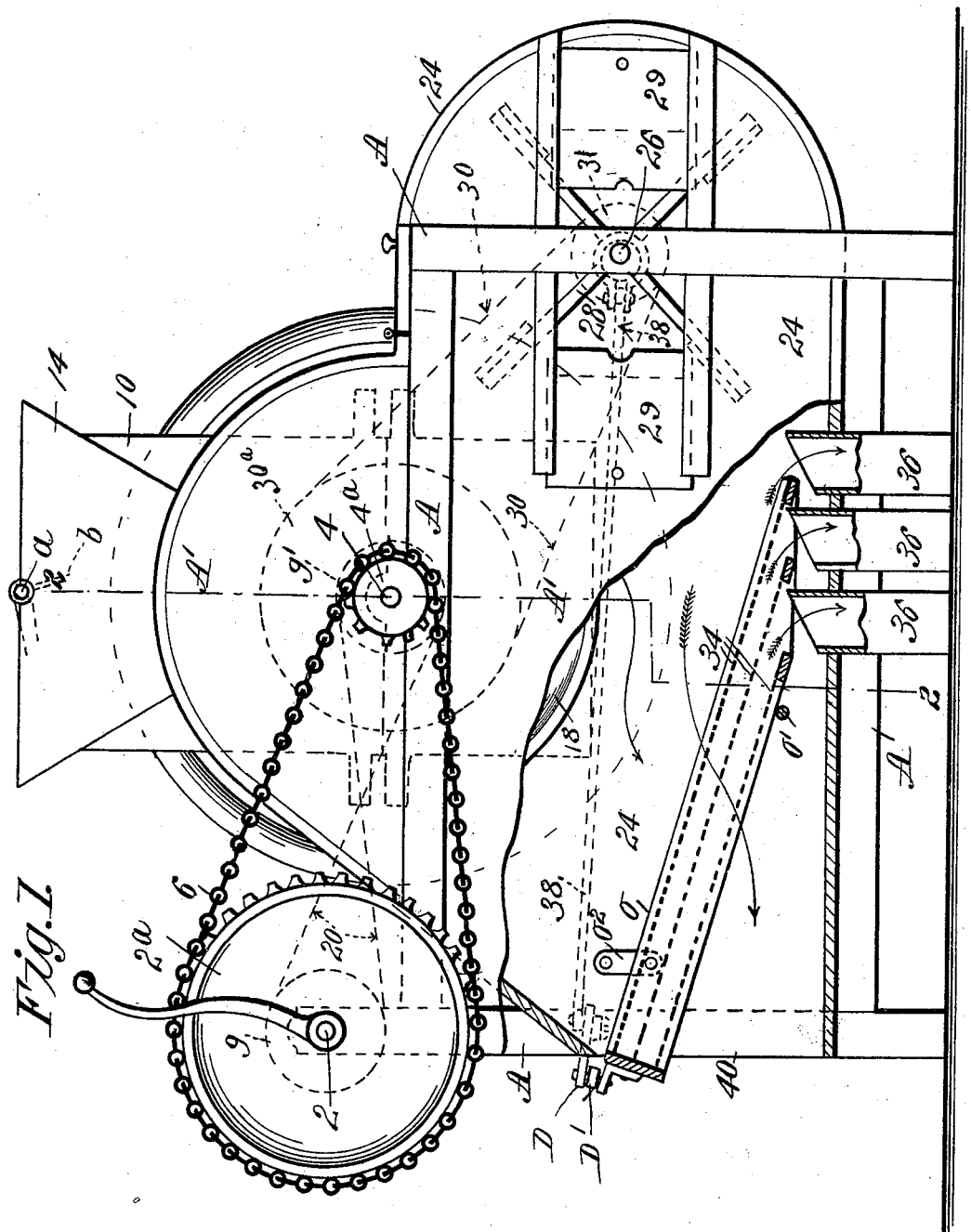
Fig. I.
Witnesses:
J. D. Garfield
K. J. Clemons
Inventor,
Albert B. Couch,
by Chapin & Co.
Attorneys.

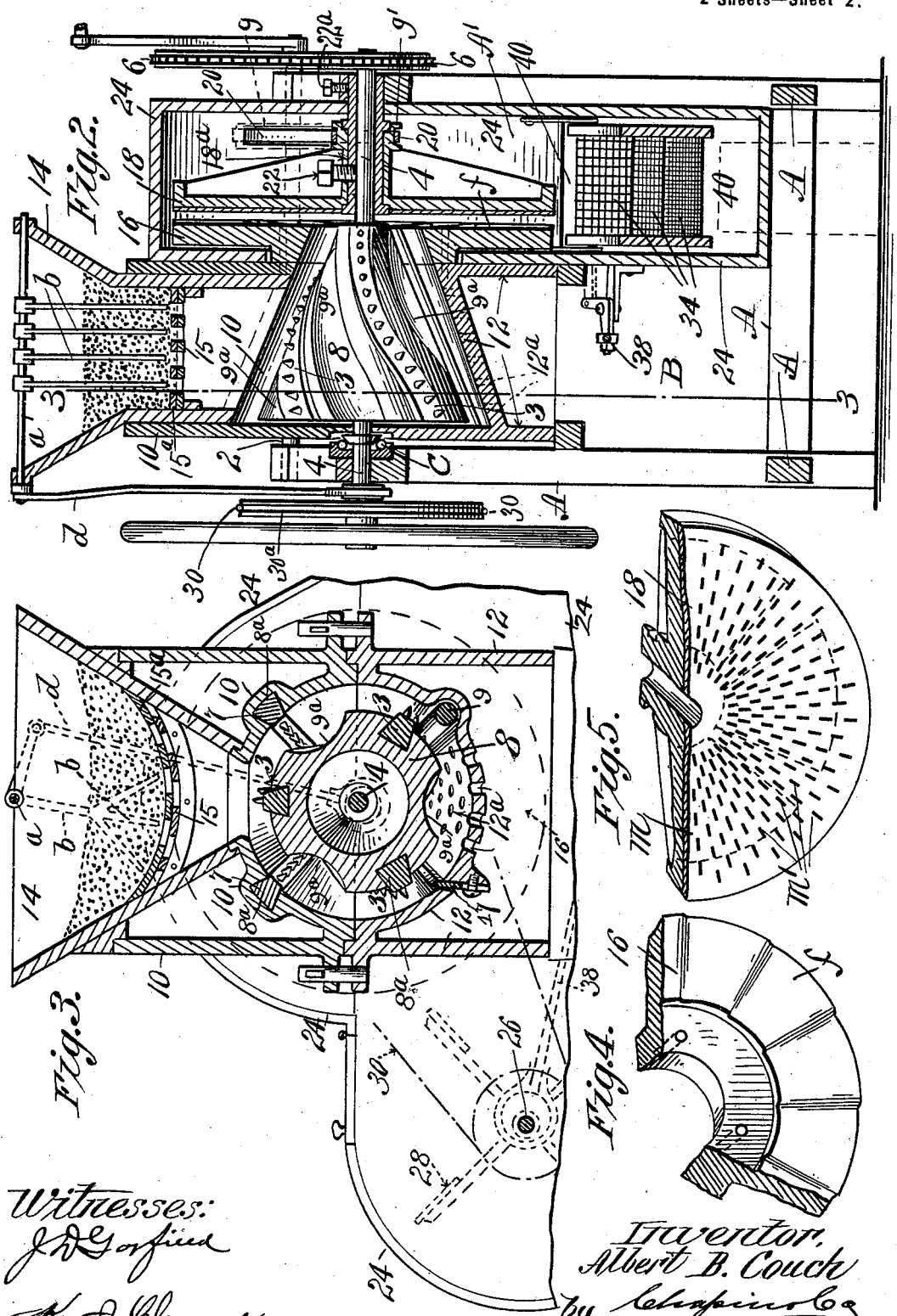

UNITED STATES PATENT OFFICE.

ALBERT B. COUCH, OF PELHAM, GEORGIA.

MACHINE FOR HULLING AND POLISHING GRAINS.

SPECIFICATION forming part of Letters Patent No. 629,547, dated July 25, 1899.

Application filed March 29, 1898. Serial No. 675,530. (No model.)

*To all whom it may concern:*

Be it known that I, ALBERT B. COUCH, a citizen of the United States of America, residing at Pelham, in the county of Mitchell and State of Georgia, have invented new and useful Improvements in Machines for Hulling and Polishing Grains, of which the following is a specification.

This invention relates to machines for hulling rice and similar grains or cotton or other seeds inclosed in soft-shell pods or cases; and the object of the invention is to produce a machine so constructed as to be readily adapted to operate on seeds or grains having widely-varying characteristics and of greatly-varying dimensions and in addition to hulling or shelling the kernels to provide means for polishing, winnowing, and screening the same and sorting them by passing them through suitably-graded screens.

The invention consists in the improved construction described in the following specification and pointed out in the claims.

In the drawings forming part of this specification, Figure 1 represents a machine constructed according to this invention, shown in side elevation, certain parts thereof being broken away. Fig. 2 is a vertical cross-section on line 2 2, Fig. 1. Fig. 3 is a longitudinal section on line 3 3, Fig. 2. Fig. 4 is a perspective view of a stationary polishing-disk. Fig. 5 is a perspective view of a rotating polishing-disk.

Referring to the drawings, A represents the frame of the machine, and A' the casing inclosing parts thereof. On the top of said frame, at one end thereof, is the driving-shaft 2, on which is secured a sprocket $2^a$, and means for rotating said shaft may consist of a crank-handle, as shown, if hand-power is to be used, or a pulley may be substituted if mechanical power is to be used.

About midway between the ends of the frame A of the machine and parallel with the driving-shaft 2 is located the shaft 4, extending transversely across the machine like the shaft 2. Said shaft 4 is also provided with a sprocket $4^a$, and a chain 6 engages the said sprockets $2^a$ and $4^a$ for rotating the shaft 4 at a suitable speed. On said shaft 4 is secured a cone 8, which is inclosed by a cone-shaped casing, preferably made in two parts 10 and 12, the upper part 10 thereof being removable from the lower part 12, whereby said cone 8 is made easily accessible for the purpose of cleaning it or for adjusting or replacing parts of said cone which may have become worn. Said parts of the cone 8 consist of several bars 3, spirally applied to said cone (preferably in dovetailed grooves, as shown) and removable therefrom. Said bars 3 are provided with teeth intermeshing with similar toothed bars 7, removably applied in grooves $8^a$ to the casing, or they may be provided with knife-edges 17, only one of which is shown in the drawings and which may be located in either the upper or lower portion of the casing, or both, it depending upon the kind of grain or seeds to be treated, or said bars in the cone may be furnished with some yielding surface, as rubber, and operate against rolls 9 in the parts 10 or 12 of the casing, one of which only is shown in the drawings in Fig. 3. The said several forms of bars or rolls are inserted in said cone and casing according to the nature of the material to be operated upon. For instance, small seeds having delicate shells or hulls must be treated by rubbing or rolling, whereas peas (in the pod) must be subjected to the action of the toothed bars.

An antifriction thrust-bearing C is provided for the shaft 4 (see Fig. 2) of any well-known construction.

Between the bars 3 on the cone 8 are provided spirally-arranged grooves or depressions $9^a$, extending from one end to the other of the cone, which permit a larger quantity of grain or seed to be introduced between the cone and casing and which, owing to their spiral form, serve to convey said grains or seed toward the delivery end of the cone.

The shaft 4 is provided on one end thereof with a suitable balance-wheel and has a pulley $30^a$ secured thereto in proximity to said balance-wheel, over which a belt 30 runs to a pulley 31 on shaft 26, on which last-named shaft is supported a fan-wheel 28, suitably incased and adapted to send a current of air through the screens 34 in the direction of the arrow shown thereon. Any chaff or dust, &c., falling from the lower part 12 of the cone-casing through the perforations $12^a$ therein drops to the ground.

The parts 10 and 12 of the casing are suitably supported concentric with the cone 8 in the frame of the machine, the large end of the casing being closed and the small end leading into an opening in the center of the stationary polishing-disk 16, which is supported in any suitable manner. On the end of the shaft 4 which extends beyond the small end of the cone is secured the rotating polishing-disk 18, which is adjustable toward and from the disk 16, the adjoining faces of said disks being parallel. The upper part 10 of the cone-casing has an opening through the upper surface thereof, over which is placed a hopper 14, into which is fed the material to be treated in the machine. The bottom $15^a$ of the hopper is provided with openings through which the grain may fall into the part 10 of the casing, and a slide 15 lies under said bottom $15^a$ and has perforations therein coinciding in position and area to the perforations in the bottom of the hopper. By moving the slide the areas of the perforations through which the grain is delivered to the machine may be regulated as desired.

Supported in the top of the hopper is a shaft $a$, to which are secured agitating-fingers $b$, which extend down into the grain in the hopper 14, the bottom $15^a$ of which is curved to correspond to the swing of said fingers $b$, and the movement of said fingers back and forth in said hopper prevents the clogging of the grain therein. Said fingers are given the requisite reciprocating swing in the hopper by a crank on the end of the shaft $a$, connected to one end of a rod $d$, whose opposite end has an eccentric connection with the shaft 4, the rotation of the latter imparting the necessary motion to said shaft $a$.

The stationary polishing-disk 16 is provided on the face thereof opposite the face of the rotating polishing-disk 18 with a series of step formations consisting of parallel plane surfaces $f$, extending from the edge of said disk inward toward the center and which lie at a slight angle relative to the plane of rotation of the said rotating disk 18. Said inclined plane surfaces cover practically all of the operative part of the said disk and preferably are covered with rawhide or some similar substance to the end that the grains or seeds subjected to the rolling process between said disks 16 and 18 shall not be crushed thereby. Said rotating disk 18 is provided with a sleeve $18^a$, on which it may rotate freely or to which it may be secured by a set-screw 22, and the sleeve $18^a$ is also secured to the shaft 4 by the set-screw 22. The purpose of this construction is to provide means for rotating the disk 18 with the shaft 4, or, if a direction of rotation opposite to that of the shaft 4 is desired, the set-screw 22 is removed and the cross-belt 20 is applied to the pulleys $g$ $g'$ on the shafts 2 and 4, respectively, and the driving-shaft 2 then drives the disk 18 in the direction required. The set-screw $22^a$ is employed to secure the sleeve in its bearing in such position that the degree of separation of the contiguous faces of the disks 16 and 18 may be proper for the kind of grain or seeds being operated on.

The disk 18 is preferably provided with a facing $m$, of metal, (steel being usually used,) and it is provided with short radial perforations $m'$, as shown. Said disk 18 is of skeleton form, as indicated in Fig. 5 in dotted lines, and the chaff and dust from the grain can thus pass through the perforations $m'$ in the metal facing $m$ and falling into the space between the side casing $A'$ and the disk are carried out of the machine through the opening 40 by the blast of air generated by the fan-wheel 28. To admit air to said fan, sliding doors 29 are provided for admitting to the chamber occupied by the fan as much air as may be required.

The screens 34 are of the usual construction used for grading seeds, &c., and consist of superposed screens of varying-sized mesh and each screen leading to a separate chute 36, communicating with separate boxes or other receptacle, all as shown in Fig. 1. The three screens shown in the drawings are all secured to a common frame $o$, supported for a sliding movement on a transverse rod $o'$ or some similar support, and the opposite end of the frame is supported on two loosely-hung arms $o^2$, secured by one end to the casing $A'$ and by the other end to the side of the screen-frame $o$.

Near the upper and outer end of the screen-frame $o$ and on the casing $A'$ is secured an elbow-lever D, one arm of which is connected through a short lever $D'$ to the end of the screen-frame and the other arm of which is connected by a rod 38, extending to the shaft 26, on which is an eccentric to which the end of said rod 38 is connected and whereby shaking movement is imparted to said screen-frame $o$. The rotation of the disk 18 throws the grain or seed emerging from between the disks 16 and 18 toward the upper end of the screens, as indicated in Fig. 1, thus separating it and giving the air-blast free passage through it, whereby all dust and chaff are thoroughly removed.

Having thus described my invention, what I claim, and desire to secure by Letters Patent, is—

1. In combination in a machine for hulling and polishing seeds and grains, a suitable frame, a cone-shaped casing axially separable, a shaft supported in said frame for rotation axially in said casing, a cone fixed on said shaft, huller-bars having abrading-surfaces projecting beyond the inner surface of said casing and removably secured thereto, spirally-formed huller-bars having abrading-surfaces projecting beyond the surface of said cone and removably secured thereto, a rotatable disk supported on said cone-shaft, a stationary disk parallel with and in proximity to said rotatable disk secured to said casing near the small end of said cone, the casing having an opening centrally located relative to said cone whereby the rotation of said cone will cause seeds to be delivered between said stationary and rotatable disks, a screen located under said disks, a fan for directing a current of air across said screen, a hopper supported on said casing above said cone, an opening in said casing under said hopper, and means for regulating the area of said opening, substantially as described.

2. In a machine for hulling and polishing grains and seeds, means for effecting said hulling and for polishing the kernels of said grains or seeds, consisting of a suitably-supported and axially-separable cone-shaped casing, a cone of the same angle and having a smaller diameter than the interior of said casing and axially located therein, a suitably-supported shaft to which said cone is secured, a stationary disk secured to said casing, which has an opening therein communicating with the interior of said casing at the small end of said cone, a rotatable disk supported in proximity to and in a plane parallel with said stationary disk, means for rotating the rotatable disk with said cone, or in a reverse direction, independently of said cone, huller-bars removably secured to the surface of said cone, and the interior of said casing, means for rotating said cone and said rotatable disk, and a suitable grading-screen for receiving grains or seeds from said disks, substantially as described.

ALBERT B. COUCH.

Witnesses:
   C. L. STANLEY,
   H. J. ADAMS.